United States Patent [19]

Phillips

[11] Patent Number: 4,529,422
[45] Date of Patent: Jul. 16, 1985

[54] SONIC HORN FAILURE DETECTION SYSTEM

[75] Inventor: Norman D. Phillips, Bethlehem, Pa.

[73] Assignee: Fuller Company, Bethlehem, Pa.

[21] Appl. No.: 617,200

[22] Filed: Jun. 4, 1984

[51] Int. Cl.³ ............................................. B01D 53/30
[52] U.S. Cl. ........................................ 55/270; 55/274; 55/277; 55/292; 340/540
[58] Field of Search ............... 55/15, 270, 277, 292, 55/274; 340/540, 579, 583; 364/550

[56] References Cited

U.S. PATENT DOCUMENTS

| | | | |
|---|---|---|---|
| 3,053,031 | 9/1962 | Vedder et al. | 55/292 |
| 3,158,455 | 11/1964 | Lincoln | 55/292 |
| 3,697,973 | 10/1972 | Stevens et al. | 340/540 X |
| 4,035,165 | 7/1977 | Archer | 340/540 X |
| 4,250,499 | 2/1981 | Kienzle | 340/540 X |

Primary Examiner—Charles Hart
Attorney, Agent, or Firm—Frank H. Thomson

[57] ABSTRACT

In a fabric filter dust collector of the type including a plurality of elongated tubular fabric filter elements with an inlet for gas and entrained solids, an outlet for filtered gas and an outlet for separated solids wherein the gas and entrained solids enter the dust collector, the gas passes through the fabric filters to the outlet of the collector and particulate material is collected on the surface of the tubular filter elements. A sonic horn cleaning system including sound generators or horns are positioned in the dust collector which when sounded transmit energy to the filter elements to remove the filter cake from the tubular filter elements. A system is provided for determining whether the horns are operating and includes a tube connected to the vent of the horn which tube passes through the casing wall to a remote location where a sound detecting device can be utilized to pick up sound waves transmitted through the tube from an operating horn. The failure detection system can be used in other applications where several sonic generators are used in a confined space to determine which generators are operating.

4 Claims, 2 Drawing Figures

SONIC HORN FAILURE DETECTION SYSTEM

BACKGROUND OF INVENTION

This invention relates to a failure detection system for use in combination with a plurality of horns within a confined or enclosed space. This invention particularly relates to fabric filter dust collectors which utilize a sonic horn for assisting in cleaning the filter bags and more particularly to an apparatus for detecting from a remote location whether the sonic horn is operating.

According to U.S. Pat. No. 2,769,506 issued to H. I. Abboud on Nov. 6, 1956, a gas solid separator of the type utilizing a plurality of tubular filter elements can utilize a filter cleaning system incorporating at least one sonic generator or horn positioned within the collector or other confined or enclosed space which, when sounded, subjects the filter elements and dust cake to sound waves emitted from the horn. This energy input causes the filter cake on the bags or filter elements to drop off into a hopper from which it is discharged from the collector. The apparatus may be used either by itself or in combination with either a shaker or reverse air cleaning systems well known in the art.

In many applications, there will be a plurality of horns utilized in each compartment with the horns positioned at various locations throughout the compartment. The dust collector itself will be well insulated to insure that the proper temperature is maintained within the dust collector to prevent the inside of the collector from reaching the dew point. Due to the use of several sonic horns and the insulated dust collector, it if often difficult to detect whether or not a given horn is functioning or has failed.

In the past, in order to determine whether a horn is functioning, it has been common practice to shut off a particular compartment from normal filter operations, have a maintenance person enter the compartment while wearing ear protection devices and have the horn circuit manually actuated from outside the compartment while the maintenance person checks each horn for operation. It would be useful to devise an economical system for determining from a remote location such as the control console whether the various horns are operating.

It has also been found that sonic horns may be used in assisting the removal of material which has accumulated in a hopper such as the hopper of a dust collector as shown in U.S. Pat. No. 3,489,317, issued to R. J. Wright on Jan. 13, 1970. Other applications of sonic horns may include any place where there is an accumulation of particulate material on a surface within an enclosed space. In each application of sonic horns, where there are a plurality of horns within a given area, it would be desireable to have an economical system for detecting whether each of the horns is operating.

SUMMARY

It is therefore the principal object of this invention to provide a system for detecting from a remote location whether sonic generators are functioning.

It is a further object of this invention to provide a sonic horn failure detection system which utilizes a tube extending from the vent of the horn through the sidewall of the enclosure to a remote location for transmitting sound waves from the horn to a remote location where the sound emitted by the horn can be detected.

In general the foregoing and other objects of the invention will be carried out by providing in a gas-solids separator including a casing having an inlet for gas and entrained solids, an outlet for filtered gas, an outlet for separated solids, a plurality of filter elements positioned between the inlet for gas and entrained solids and the outlet for filtered gas whereby gas flows through the filter elements and solids are collected on the filter elements, and sound generator means positioned within said casing and adapted to be periodically activated to subject said filter elements to sound waves emitted from the sound generator means for removing from the filter elements solids collected on the filter elements, the improvement comprising means for sensing at a remote location whether the sound generator means is functioning including means for transmitting sound waves to the remote location.

BRIEF DESCRIPTION OF THE DRAWING

The invention will be described in connection with the annexed drawing wherein.

DESCRIPTION OF THE PREFERRED EMBODIMENT

Figure 1:
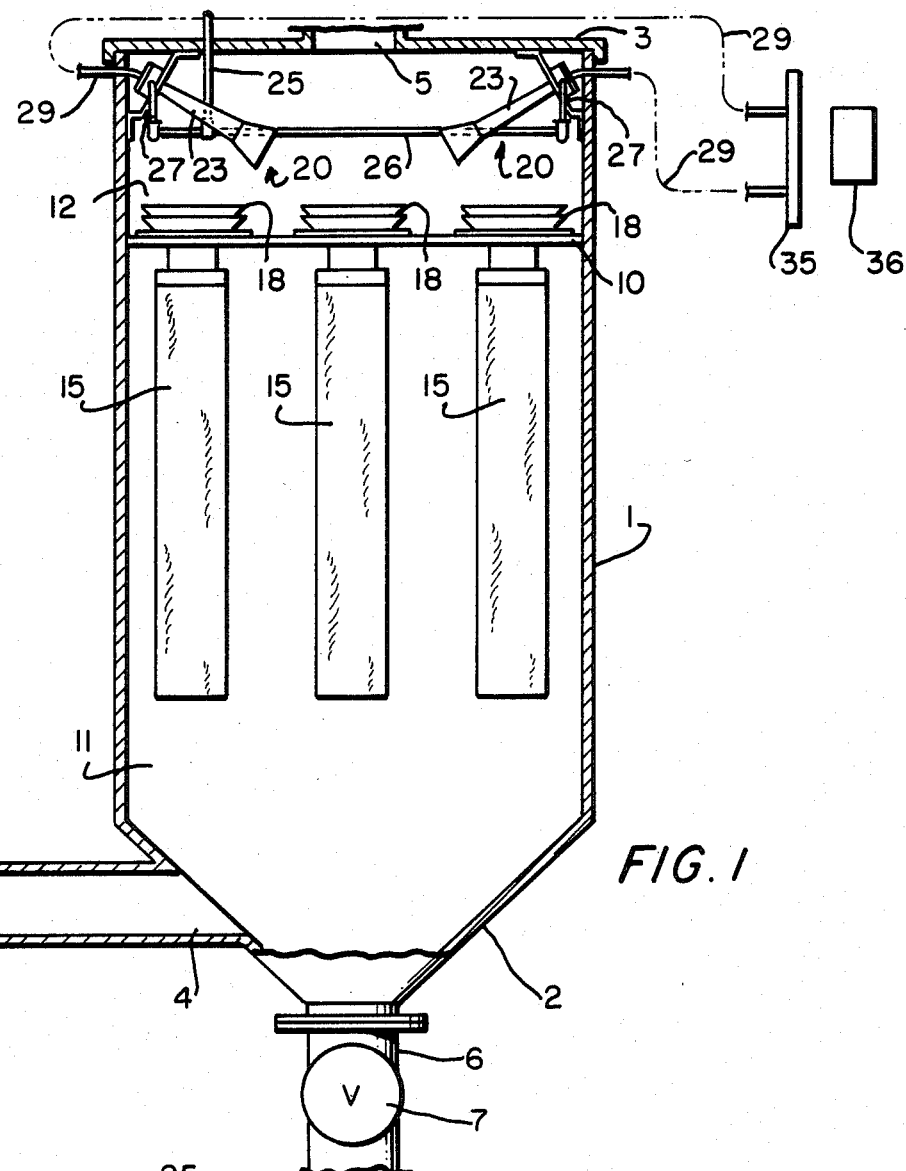
FIG. 1 is a sectional view in a diagramatic form of a dust collector apparatus using the present invention.

The present invention is particularly adapted for use in a gas solids separator or fabric filter dust collector commonly referred to as a baghouse. Such a gas solid separator includes a casing 1 having sidewalls and endwalls and a bottom hopper 2 and a top 3. The casing includes a lower inlet 4 for gas and entrained solids and an upper outlet 5 for filtered gas. The hopper 2 includes an outlet 6 for separated solids. This outlet may include a suitable valve means 7 for controlling material flow out of the hopper and maintaining a gas tight seal.

The inside of the casing may include a tube sheet 10 dividing the collector into a lower compartment 11 and an upper compartment 12. The clean gas outlet 5 is flow connected to the upper compartment 12. A plurality of flexible fabric tubular filter elements 15 extend through openings in tube sheet 10. Suitable means may be provided to ensure that the filter bags retain their shape such as by having rings sewn into the bags or having the bags mounted on cages. A clean gas outlet means 18 may be positioned at the upper end of each filter element 15 within the upper compartment 12 for aiding in the flow of gas.

In a manner well known in the art, gas to be filtered enters the collector through inlet 4 and gas flows through the filter elements 15 and solids are collected on the outer surface of the filter elements. The cleaned gas which has passed through the fabric of the filter elements then flows into upper compartment 12 to clean gas outlet 5. Periodically, the filter cake collected on the surface of the elements 15 must be removed in order to allow continued filtering operations and keep at a minimum the pressure drop across the collector.

The collector illustrated is of the type where particulates are collected on the outer surface of the filter bags. The invention is equally applicable to a dust collector where particulates are collected on the inside of the filter bag. In such a case, the tube sheet would be at the lower end of the bag with the bags suspended from the top of the collector.

Several techniques are well known in the art for removing filter cake from the bags. One method is to provide for a reverse flow of gas which is supplied to the clean side of the filter elements from upper compartment 12 for flow in a reverse direction through the tubular filter elements to thereby remove the collected filter cake. The dust will then drop into the hopper 2 of the casing where it can be either periodically or continuously removed through outlet 6. Another method of cleaning the filter elements is utilize a mechanical means to periodically shake the filter elements so that collected dust drops off the surface of the element 15 into hopper 2 and subsequent removal through outlet 6.

As described in U.S. Pat. No. 2,769,506, a further technique of cleaning the filter elements is to provide one or more horns or sonic generators within the clean compartment 12. This sonic generator is periodically sounded with the sound waves emitted by the horn being transmitted to the filter elements which energy serves to remove collected dust from the filter elements. These sonic generators can be used in some applications alone as the sole means for bag cleaning or in combination with a reverse air or shaker cleaning system.

In large dust collector installations such as power plants, several sonic generators will be utilized within each compartment. These compartments are well insulated to maintain temperature within the collector to prevent operation below the dew point. This insulation will also muffle the sound of the horn. Due to the use of several horns within each compartment and the insulated collector, it is often difficult to determine whether any given horn is operating. If a horn fails to operate, less efficient cleaning of the bags or filter elements within a given compartment will take place thereby reducing overall collector efficiency.

By the present invention each sound generator means generally indicated at 20 is of the air operated type and are generally as described and shown in U.S. Pat. No. 3,489,317. These horns include a generator section 21 and a bell 23 aimed towards the top of the filter elements 15. As illustrated, the horns are positioned within the upper compartment 12 but it should be understood that in some applications it may be desireable to have the horn located in the lower compartment 11.

The horns illustrated are operated by air under pressure and include a conduit 25 connected at one end to a suitable source of compressed gas and at its other end to each of the horns 20 through conduits 26 and 27 to the generator 21. As illustrated in U.S. Pat. No. 3,489,317, air under pressure is selectively supplied to a given generator 21 which causes a reed or diaphragm within the generator to vibrate and emit sound waves from bell 23. Each generator 21 includes an air outlet or vent 28 at its upper end. According to the present invention there are a plurality of tubular conduits or vent tubes 29, each connected at one end to the air outlet or vent 28 of one horn and passes through an opening 31 in the casing 1 and insulation 30. A suitable packing gland 32 is operatively associated with the tube 29 and the opening 31 through the casing forming a gas tight seal between the casing and the tube 29.

The tube 29 operatively associated with each sound generator 20 is connected at its other end to a remote location outside of the casing 1 of the separator such as a control panel diagramatically illustrated at 35. The tube 29 defines a means for transmitting sound waves to the remote location. At the control panel a sound detecting device diagramatically illustrated at 36 is adopted to selectively cooperate with the remote or other end of tube 29 for sensing whether the sound generator 20 with which a given tube 29 is operatively connected is in fact functioning.

As illustrated in FIG. 1, there are a plurality of sound generating devices 20 and a plurality of vent tubes 29 with each vent tube operatively associated with the one of the sound generators 20. Each sonic generator may be supplied with operating air through common source and conduits 25 and 26.

Figure 2:
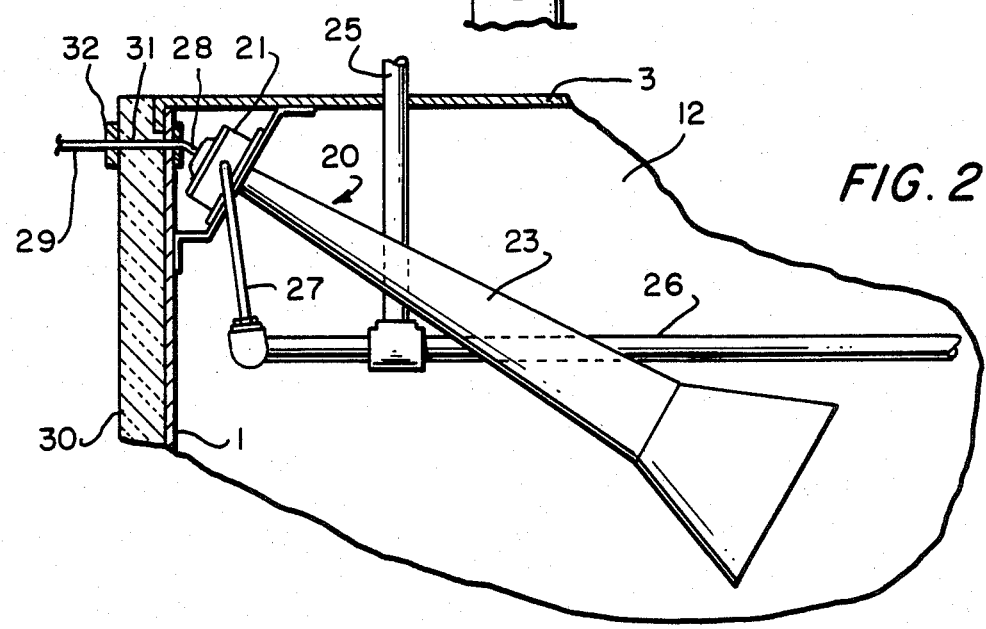
FIG. 2 is a view on an enlarged scale of the installation of the sonic generator utilized in the present invention.

A standard sound generator 20 may include a $\frac{3}{8}$" vent tube at the top of the generator housing. It has been found by tests that sound level readings adjacent to the generator are approximately 100 dBA while measurements taken at the tip of the short $\frac{3}{8}$" tube used in the past indicated a sound level of 125 to 130 dBA. According to the present invention, the short vent tube of the prior art is replaced by tubing as long as 50 feet in length. The sound waves move through the tube and at the end of this tube the sound level is still measured at 130 dBA. This means that a very simple failure detection system has been devised. A length of approximately $\frac{3}{8}$" tubing is attached to each sound generator and led through the compartment wall as shown in FIG. 2 through the threaded packing gland 32 to produce a gas tight seal around the tubing and wall penetration. All tubes from the many generators in the compartment may be located in a close cluster at an accessible location on the outside compartment wall, or, as illustrated in FIG. 1, at a control panel 35. A standard sound measurement test unit such as a General Radio Company Type 1565A Sound Level Meter can be used manually for detecting whether a given horn is emitting sound when operated. A manual checking can be periodically used by sounding each horn through suitable electrical control arrangements and listening at the outlet or remote end of the tube 29 to determine whether or not the horn to which a given tube is connected is operating.

From the foregoing it should be apparent that the objects of this invention have been carried out. A simple inexpensive failure detection system has been provided for detecting failures of the sonic horn used in a dust collector cleaning system. If a failure is detected, an operator can then enter the collector to repair or replace the same to maintain dust collection efficiency.

While the invention has been illustrated in conjunction with sonic horns used in assisting the cleaning of filter elements of baghouse, the failure detection system is suitable for use in other applications where multiple horns are operated. For example, if multiple horns were used in the hopper as illustrated in U.S. Pat. No. 3,489,317, the failure detection system would be used. Any application of sound generators within a confined space can utilize the present invention.

It is intended that the foregoing be merely a description of a preferred embodiment and that the invention be limited solely by that which is within the scope of the appended claims.

I claim:

1. In a gas solids separator including a casing having an inlet for gas and entrained solids, an outlet for filtered gas, an outlet for separated solids, a plurality of filter elements positioned between the inlet for gas and entrained solids and the outlet for filtered gas whereby gas flows through the filter elements and solids are collected on the filter elements, and sound generator means positioned within said casing and adopted to be selectively activated to subject said filter elements to sound waves emitted from the sound generator means for removing from the filter elements solids collected on the filter elements, the improvement comprising means for sensing at a remote location whether the sound generator means is functioning including a tube operatively connected at one end to the horn and at its other end to a remote location outside the casing for transmitting sound waves to the remote location, and a sound detecting device adopted to cooperate with said other end of the tube for sensing sound waves transmitted through said tube for determining whether the sound generator means is function.

2. In a gas-solids separator according to claim 1 wherein the sound generator means includes an air operated horn including means for selectively supplying air under pressure to the horn for selectively generating sound waves and a vent, the improvement further comprising said tube connected at one end to the vent of the horn and said tube extends through said casing to said remote location.

3. In a gas-solids separator according to claim 1 wherein there are a plurality of sound generating means, the improvement further comprising a plurality of tubes, each connected at one end to one of said sound generating means and at its other end to a remote location.

4. In a gas-solids separator according to claim 3 the improvement further comprising a plurality of openings in said casing, each adapted to permit one of said tubes to pass therethrough and a plurality of packing glands, each operatively associated with one of said tubes and one of said openings for forming a gas tight seal between said casing and said tube.

* * * * *